United States Patent [19]

Suhr

[11] 4,070,095

[45] Jan. 24, 1978

[54] PAVEMENT MARKER AND REFLECTOR ASSEMBLY

[75] Inventor: Donald C. Suhr, Farmington Hills, Mich.

[73] Assignee: ITL Industries, Inc., Newark, Ohio

[21] Appl. No.: 654,121

[22] Filed: Feb. 2, 1976

[51] Int. Cl.² .............................................. G02B 5/124
[52] U.S. Cl. ..................................... 350/103; 350/97; 350/105; 404/12; 404/14
[58] Field of Search ................... 350/97, 103, 67, 105; 404/12, 14

[56] References Cited

U.S. PATENT DOCUMENTS

| 3,485,148 | 12/1969 | Heenan | 404/12 |
|---|---|---|---|
| 3,771,851 | 11/1973 | Heenan et al. | 350/97 |
| 3,924,929 | 12/1975 | Holmen et al. | 350/103 |

Primary Examiner—John K. Corbin
Assistant Examiner—B. W. delos Reyes
Attorney, Agent, or Firm—Reising, Ethington, Barnard, Perry & Brooks

[57] ABSTRACT

A pavement marker including a body having a base for engagement with the surface of a roadway, and a reflector assembly mounted on the body for reflecting light from vehicles on the roadway when the fore-and-aft axis of the body is disposed in parallel relationship with the direction of vehicular travel on the roadway. The reflector assembly includes a pair of plate-like members of light transmitting material. The plate-like members each has an outer surface and an inner surface. The plate-like members are secured together at their peripheries with the inner surfaces thereof disposed in opposed relationship. Retrodirective reflector elements are formed on one inner surface, and the apices of the reflector elements are spaced from the other inner surface. A plurality of support members extend between the inner surfaces to maintain the apices of the reflector elements out of contact with the other inner surface and to provide impact strength to the assembly. The support members are spaced from each other so that the reflector elements have no contact with any of the support members. The support members, in addition to providing structural strength to the reflector assembly, may provide for specular reflection of ambient light to enhance the daytime visibility of the pavement marker.

6 Claims, 6 Drawing Figures

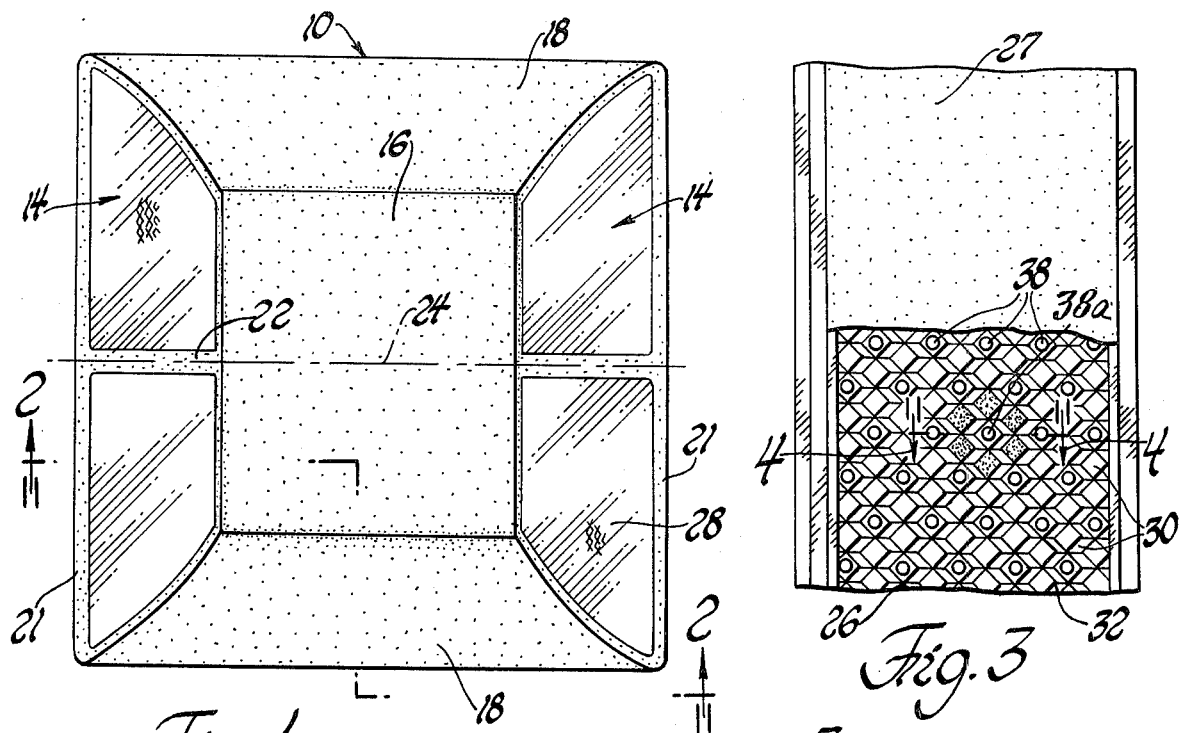
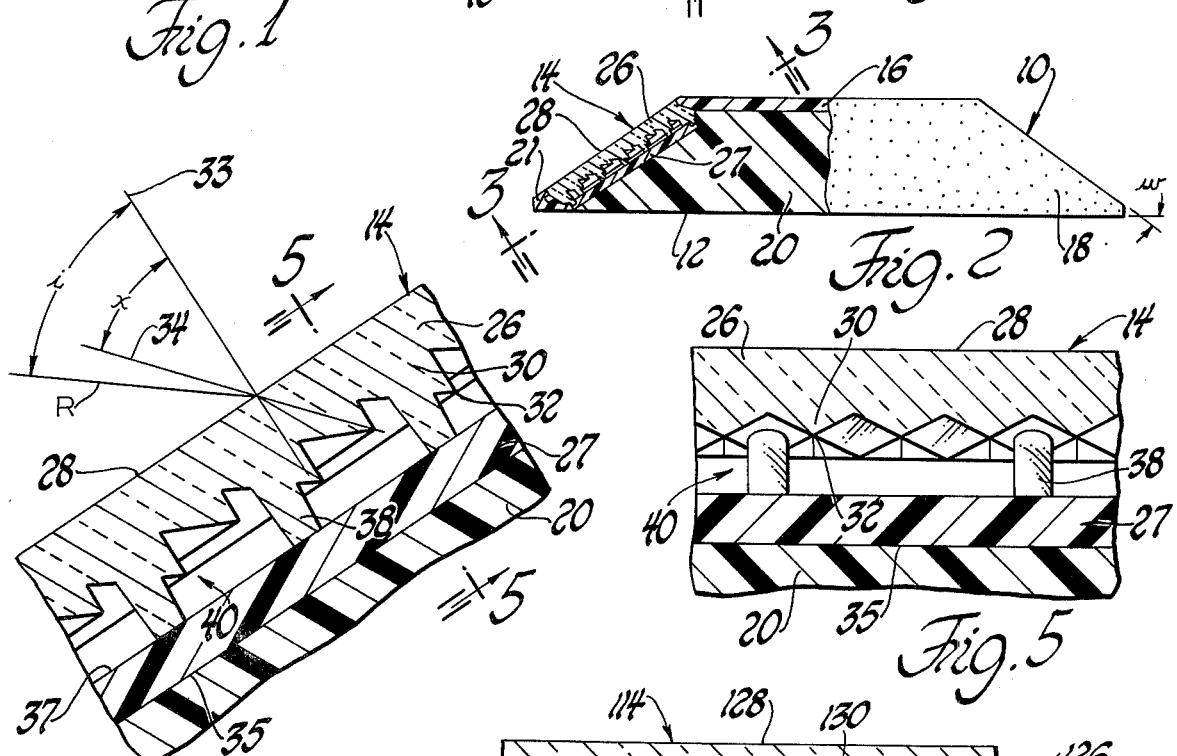

PAVEMENT MARKER AND REFLECTOR ASSEMBLY

BACKGROUND OF THE INVENTION

1. Field of the Invention

This invention relates generally to pavement markers, and is particularly concerned with pavement markers of the type that utilize retrodirective reflecting elements, such as cube-corner reflector elements, for reflecting light from vehicles traveling over the roadway surface on which the pavement marker is secured. The invention also is concerned with the construction of a high strength reflector assembly, particularly, but not exclusively, useful in pavement markers.

2. Description of the Prior Art

U.S. Pat. Nos. 3,332,327 and 3,409,344 disclose pavement markers having retrodirective reflector elements of the cube-corner type formed thereon. The cube-corner reflector elements are formed on an outer wall of the pavement marker, which outer wall is frequently engaged by the wheels of vehicles traveling over the roadway. In order to provide adequate strength to withstand the forces imposed by the vehicle wheels, the pavement marker bodies are filled with epoxy resin or the like. In order to protect the cube-corner reflector elements from moisture and chemical attack, the surface of the reflector elements are metallized. While the metallized layer performs the function of protecting the reflector elements, is also causes a loss of optical efficiency. The loss of optical efficiency can be as high as 50%.

U.S. Pat. Nos. 3,627,403 and 3,784,279 disclose pavement markers wherein a sheet of flexible plastic material is interposed between the cube-corner reflector elements and the resin fill to protect the reflector elements from moisture and chemical attack. It is difficult to assemble the flexible plastic sheet in the pavement marker with presently known manufacturing methods; hence, the manufacturing costs of such pavement markers have thus far been excessive.

U.S. Pat. No. 3,485,148 discloses a pavement marker wherein groups of cube-corner reflector elements are enclosed in cells by integral walls formed on the reflector body and surrounding each of the cells. The walls support the reflector body on a high strength metal housing. While the walls provide strength to the reflector body, the walls provide no reflectivity for vehicle lights. Consequently, the total number of reflector elements, and hence the overall reflectivity of the reflector body is substantially reduced.

Reflectors for marking the sides of landing strips, roadways, and for use on bicycles and motor vehicles, such as disclosed, for example, in U.S. Pat. Nos. 3,541,606; 3,545,839 and 3,781,082, are frequently subject to damage by the impact of stones, pebbles and the like on the outer face of the reflector. Usually, such reflectors have unsupported walls on which the retrodirective reflector elements are formed. The unsupported walls have low resistance to impact forces.

SUMMARY OF THE INVENTION

An object of this invention is to provide a reflector assembly particularly suitable for use in pavement markers wherein the retrodirective reflector elements are protected by a backing plate and are held in spaced relationship with the backing plate by a plurality of small posts extending between the backing plate and reflector elements.

A further object is to provide a pavement marker having a high strength reflective wall wherein the reflector elements of the reflective wall are protected from chemical attack without the necessity of coating the surface of the reflector elements by vacuum metallizing or the like.

In carrying out the foregoing, and other objects, a reflector assembly according to the present invention includes a first plate-like member of light transmitting synthetic resin material having reflector elements formed on its inner surface. A second plate-like member of synthetic resin, and which may also be of light transmitting material, is secured by sonic welding, or the like, to the first plate-like member at its periphery. The opposed, inner surfaces of the two plate-like members are in spaced relationship, with the apices of the reflector elements of the first member in spaced relationship with the inner surface of the second member. A plurality of support members in the form of small posts or support pegs extend between the inner surfaces of the first and second members to hold the surfaces in spaced relationship and provide impact strength to the assembly. The support members are spaced from each other, and each has one end integrally connected with the inner surface of one of the plate-like members and its other end abutting the inner surface of the other plate-like member. The support members are spaced from each other such that some of the reflector elements have no contact with any of the support members.

In accordance with the invention, the reflector assembly may be mounted on the body of a pavement marker to form a wall of the pavement marker body. The second plate-like member serves as a backing plate for the first plate-like member having the reflectors mounted thereon. The pavement marker body may include a mass of epoxy resin, or the like, for structural strength. The backing plate is imbedded in the epoxy resin and protects the reflector elements from moisture and from chemical attack by the epoxy resin or other filler material.

Other objects, advantages and features of the invention will become apparent from the following description taken in connection with the accompanying drawings.

DESCRIPTION OF THE DRAWINGS

FIG. 1 is a plan view of a pavement marker embodying the present invention;

FIG. 2 is a partial sectional view taken on lines 2—2 of FIG. 1;

FIG. 3 is a view of the reflector assembly taken on lines 3—3 of FIG. 2;

FIG. 4 is an enlarged, fragmentary sectional view taken approximately on lines 4—4 of FIG. 3;

FIG. 5 is a sectional view taken on lines 5—5 of FIG. 4; and

FIG. 6 is a view similar to FIG. 5 showing a modified form of the reflector assembly.

DESCRIPTION OF THE PREFERRED EMBODIMENTS

In the drawings, reference numeral 10 collectively designates the body of a pavement marker having a base 12 for engagement with the surface of a roadway. Reflector assemblies 14 form the front and rear walls of the pavement marker body. The body 10 also includes a top wall 16 and side walls 18 depending from the top wall to the base 12.

In the illustrated embodiment, the pavement marker has an outer shell forming the top wall 16, the side walls 18 as well as center strips 22 extending between the top walls 16 and lower edge portions 21. The shell is filled with resin material 20, such as epoxy resin. The strips 22 in the illustrated embodiment extend along the fore-and-aft axis 24 of the pavement marker.

The reflector assembly 14 is illustrated in detail in FIGS. 3, 4, and 5. The reflector assembly 14 includes first and second plate-like members 26 and 27 secured together at their peripheries by sonic welding or the like. The first plate-like member 26 is a reflector plate with an outer surface 28 and an inner surface formed with reflector elements 30. The illustrated reflector elements 30 of FIGS. 2–5 are cube-corner reflector elements each having a base at the plane of the interface of member 26 and projecting outwardly therefrom to an apex 32. As shown in FIG. 5, the axis 34 extends at an acute angle $x$ with respect to the normal 33 to the outer surface 28. In FIG. 4, reference character R indicates a light ray striking the surface 28 at an angle of incidence $i$ to the normal 33. The angle $x$ between the normal 33 and the axis 34 is such that the reflector elements are oriented to return the incident light R generally parallel to the direction of the light ray R.

The first plate-like member 26 may be of light transmitting synthetic resin material or the like. The second plate-like member 27 serves as a backing plate for the reflector plate 26. The backing plate 27 has an outer surface 35 seated against the resin fill 20, and an inner surface 37 spaced from the inner surface of the reflector plate 26. The apices 32 of each of the reflector elements 30 is spaced from the inner surface 37 of the backing plate 27. Reference numeral 40 indicates the air space between the reflector elements 30 on the inner surface of the reflector plate 26 and the inner surface 37 of the backing plate 27.

Extending between the inner surfaces of the first and second plate-like members 26 and 27 is a plurality of support members or pegs 38. The support pegs 38 are in the form of posts of circular cross section. Each of the support pegs 38 has one end that is integral with the inner surface of one of the plate-like members 26 and 27, with its other end abutting the inner surface of the other plate-like member 26 and 27. As shown in FIGS. 2–5, each of the support pegs 38 is integral with one of the reflector elements 30 with its outer free end abutting the inner surface 37 of the backing plate 27.

FIG. 6 illustrates another form of the invention in which the support members of the reflector assembly are formed on the backing plate instead of the reflector plate. In FIG. 6, the reflector assembly is designated collectively by reference numeral 114. FIG. 6 is similar to FIG. 5, and the reflector assembly 114 is shown as mounted on a pavement marker having the same construction as the pavement marker of FIG. 1.

The reflector assembly 114 includes first and second plate-like members 126 and 127 secured together at their peripheries by sonic welding or the like. The first plate-like member 126 is a reflector plate with an outer surface 128 and an inner surface formed with reflector elements 130. The illustrated reflector elements 130 of FIG. 6 are cube-corner reflex reflector elements identical to reflector elements 30 of FIG. 4.

The first plate-like member 126 may be of light-transmitting synthetic resin material or the like, as is the case with member 26 of the previously described embodiment. The second plate-like member 127 serves as a backing plate for the reflector plate 126. The backing plate 127 has an outer surface 135 seated against the resin fill 20, and an inner surface 137 spaced from the inner surface of the reflector plate 126. The apices 132 of each of the reflector elements 130 is spaced from the inner surface 137 of the backing plate 127. Reference numeral 140 indicates the air space between the reflector elements 130 on the inner surface of the reflector plate 126 and the inner surface 137 of the backing plate 127.

Extending between the inner surfaces of the first and second plate-like members 126 and 127 is a plurality of support members 138. In the illustrated embodiment, the support members 138 are in the form of posts of circular cross section. Each of the support members 138 has one end that is integral with the inner surface of one of the plate-like members 126 and 127, with its other end abutting the inner surface of the other plate-like member 126 and 127. As shown in FIG. 6, each of the support members 138 is integral with the inner surface 137 of the backing plate 127 with its other end abutting the reflector elements 130 on the inner surface of the first plate-like member 126. The support members 138 are spaced from each other such that some of the reflector elements 130 have no contact with any of the support members 138.

As is the case with the support members 38 illustrated in FIGS. 3, 4 and 5, the support members 138 have a transverse dimension or cross section in a plane parallel to the plate-like members 126 and 126 that is smaller than the reflector elements 130. The end 139 of each support member 138 that abuts the inner surface of the reflector plate 126 is shaped complementary to the reflector elements 130 so as to engage the reflector elements between the apices 132.

The reflector assemblies in both of the illustrated embodiments include reflector plates having "angled reflex" which is discussed in U.S. Pat. No. 3,784,279. By "angled reflex" is meant that the axes of the reflector elements 30 and 132 are not normal to the surfaces 28 and 128, respectively, of the reflector plates. Angled reflex is necessary for pavement markers having a reflector assembly forming an outer wall of the pavement marker since the outer wall must be inclined relative to the surface of the roadway. The present invention also has application in vehicle-mounted reflectors and highway delineators placed on poles along side roadways wherein it is necessary to use reflector elements of the "square reflex" variety wherein the axis of each reflector must be positioned normal to the incident beam of light.

When the reflector assembly has a reflector plate with reflectors of the "square reflex" variety, the support members corresponding to support members 38 of the embodiment of FIG. 4 will each project from an apex of a reflector element. However, the cross section of the support member, i.e., the transverse dimension in the plane parallel to the outer surface of the reflector plate (and hence normal to the axis of each reflector element) is small in comparison with the reflector elements such that a portion of each reflector element integral with a support member is still capable of reflecting.

In the embodiment of FIG. 4, approximately 33% of the reflector elements may be integral with a support member. While some reflectivity of the reflector elements that are connected with a support member will be lost, the overall reflectivity of the assembly will be increased because it will not be necessary to metallize or otherwise coat the surface of the reflector elements.

It is also possible for the backing plates 27 and 127 to be the outer plate to receive the incident light. The backing plates would, of course, be of transparent material, and the light rays would pass through the backing plates and be reflected by the reflector elements formed on the intersurface of the reflector plate 126. However, the passage of the light rays through the backing plate would reduce the reflective power of the assembly.

The pavement marker shell of FIG. 1 and backing plate 27 (or 127) can be colored for an appropriate daytime signal with the reflector plate 26 (or 126) of clear transparent material for nighttime reflectivity. If the shell and backing plate is red, the pavement marker will appear all red in the daytime, but the clear reflector plate will glow white at night when reflecting vehicle lights. Similarly, if the shell and backing plates are orange, the pavement marker will appear all orange in the daytime, and the clear reflector plate will glow white at night when reflecting vehicle lights. The shell and backing plate colors will not be visible at night.

In both embodiments, the support pegs 38 and 138 are spaced from each other in all directions such that each support peg is surrounded by a cluster of reflector elements that are out of contact with any of the support pegs. Each of the support pegs has one end that is in contact with at least one of the reflector elements. For example, a cluster of six reflector elements is shown in FIG. 3 each having one surface stippled. This cluster of reflector elements surrounds the support peg 38a. Each of the cluster of reflector elements surrounding the support peg 38a is out of contact with any of the support pegs. The same is true of the embodiment of FIG. 6. The support pegs 138 are spaced from each other in all directions such that each support peg 138 is surrounded by a cluster of reflector elements 130 that are out of contact with any of the support pegs. In both embodiments, one end of each support peg is in contact with at least one of the reflector elements. In the embodiment of FIGS. 2–5, for example, the inner end of each support peg 38 is in integral contact with one of the reflector elements 30, with its free end in abutting engagement with surface 37. In the embodiment of FIG. 6, the inner end of each support peg 138 is integral with member 127, and its free end is in abutting contact with at least one of the reflector elements 130.

While specific forms of the invention have been illustrated and described in the foregoing specification and accompanying drawings, it should be understood that the invention is not limited to the exact construction shown. Alterations in the construction and arrangement of parts, all falling within the scope and spirit of the invention, will be apparent to those skilled in the art.

I claim:

1. A reflector assembly comprising: first and second unitary plate-like members; said first plate-like member comprising a reflector of light transmitting material, one face of said first plate-like member comprising a smooth, light receiving surface and the other face thereof comprising a light reflecting surface; a plurality of retrodirective reflector elements formed on said other face; each of said reflector elements having a base at the plane of said other face and projecting outwardly therefrom to an apex; each of said reflector elements having an axis passing through the apex thereof, said axis extending at an acute angle with respect to the normal to said one face; said second member having an inner face and an outer face; said first and second members being secured together throughout their peripheries to define an enclosed air space therebetween with the inner face of said second member being disposed in opposed relationship with said other face of said first member; and a plurality of elongated support pegs each having a transverse cross-section in a plane parallel to said plate-like members that is smaller than said reflector elements; each of said support pegs having an inner end formed integral with one of said other face and inner face of said first and second members, respectively; each of said support pegs extending from its inner end across said air space to an outer free end in abutting engagement with the other of said other face and inner face of said first and second members, respectively, such that one end of each support peg is in contact with at least one of said reflector elements; said support pegs being spaced from the secured together peripheries of said first and second members and from each other in all directions such that each support peg is surrounded by a cluster of reflector elements out of contact with any of the support pegs and such that said support pegs provide support for the portions of said members spanning the distance between the secured together peripheries of said members; and each support peg having a length such that the apices of said reflector elements are held by said support pegs in spaced relationship with respect to said inner face of said second member.

2. A reflector assembly as claimed in claim 1 wherein the inner ends of said support pegs are each formed integral with one of said reflector elements.

3. A reflector assembly as claimed in claim 2 wherein each of said reflector elements has an axis passing through the apex thereof, and wherein said axis extends at an acute angle with respect to the normal to the outer surface of said first plate-like member.

4. A reflector assembly as claimed in claim 1 wherein the inner ends of said support pegs are each formed integral with the inner face of said second plate-like member.

5. A reflector assembly as claimed in claim 4 wherein each of said reflector elements has an axis passing through the apex thereof and wherein said axis extends at an acute angle with respect to the outer surface of said first plate-like member.

6. A pavement marker comprising: a body having a base for engagement with the surface of a roadway, a reflector assembly mounted on said body, said reflector assembly comprising first and second unitary plate-like members; said first plate-like member comprising a reflector of light transmitting material; one face of said first plate-like member comprising a smooth, light receiving surface and the other face thereof comprising a light reflecting surface; a plurality of retrodirective reflector elements formed on said other face; each of said reflector elements having a base at the plane of said other face and projecting outwardly therefrom to an apex; each of said reflector elements having an axis passing through the apex thereof, said axis extending at an acute angle with respect to the normal to said one face; said second member having an inner face and an outer face; said first and second members being secured together throughout their peripheries to define an enclosed air space therebetween with the inner face of said second member being disposed in opposed relationship with said other face of said first member; and a plurality of elongated support pegs each having a transverse cross-section in a plane parallel to the plane of said plate-like members that is smaller in cross-section than said reflector elements; each of said support pegs having an inner end formed integral with one of said other face and inner face of said first and second members; respectively; each of said support pegs extending from its inner end across said air space to an outer free end in abutting engagement with the other of said other face and inner face of said first and second members, repsectively, such that one end of each support peg is in contact with at least one of said reflector elements; said support pegs being spaced from the secured together peripheries of said first and second members and from each other in all directions such that each support peg is surrounded by a cluster of reflector elements out of contact with any of the support pegs and such that said support pegs provide support for the portions of said members spanning the distance between the secured together peripheries of said members; and each support peg having a length such that the apices of said reflector elements are held by said support pegs in spaced relationship with respect to said inner face of said second member, and said reflector assembly being mounted on said body such that said plate-like members extend transversely of the fore-and-aft axis of said body.

* * * * *